(12) United States Patent
Singh et al.

(10) Patent No.: US 8,545,775 B2
(45) Date of Patent: Oct. 1, 2013

(54) REFORMING EXCHANGER SYSTEM WITH INTERMEDIATE SHIFT CONVERSION

(75) Inventors: Shashi Singh, Missouri City, TX (US); Kamal Gursahani, Houston, TX (US); Robert Burlingame, Houston, TX (US); Tim Weeks, Katy, TX (US); Jim Gosnell, Houston, TX (US); Avinash Malhotra, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 111 days.

(21) Appl. No.: 13/277,809

(22) Filed: Oct. 20, 2011

(65) Prior Publication Data

US 2013/0099166 A1  Apr. 25, 2013

(51) Int. Cl.
| | |
|---|---|
| *B01J 8/00* | (2006.01) |
| *B01J 19/00* | (2006.01) |
| *B01J 7/00* | (2006.01) |
| *C01B 3/02* | (2006.01) |
| *C01B 3/32* | (2006.01) |
| *C10L 3/00* | (2006.01) |
| *C01C 1/00* | (2006.01) |

(52) U.S. Cl.
USPC .......... 422/625; 422/129; 422/187; 422/600; 422/148; 423/648.1; 48/61; 48/127.1; 48/127.3; 48/127.5; 48/127.7

(58) Field of Classification Search
USPC ......... 422/129, 187, 600, 625, 148; 423/644, 423/648.1; 48/61, 127.1, 127.3, 127.5, 127.7
See application file for complete search history.

(56) References Cited

U.S. PATENT DOCUMENTS

| | | | |
|---|---|---|---|
| 4,741,885 A | 5/1988 | Herbort et al. | |
| 4,919,844 A | 4/1990 | Wang | |
| 5,006,131 A | 4/1991 | Karafian et al. | |
| 5,011,625 A | 4/1991 | Le Blanc | |
| 5,030,440 A | 7/1991 | Lywood et al. | |
| 5,122,299 A | 6/1992 | Le Blanc | |
| 5,181,937 A | 1/1993 | Karafian et al. | |
| 5,362,454 A | 11/1994 | Cizmer et al. | |
| 5,759,500 A | 6/1998 | Garner et al. | |
| 5,925,328 A * | 7/1999 | Stahl et al. | 423/650 |
| 6,855,272 B2 | 2/2005 | Burlingame et al. | |
| 7,220,505 B2 | 5/2007 | Malhotra et al. | |
| 7,550,215 B2 | 6/2009 | Malhotra et al. | |
| 7,635,456 B2 | 12/2009 | Burlingame et al. | |
| 2001/0055560 A1 | 12/2001 | Schiodt et al. | |
| 2003/0162846 A1 | 8/2003 | Wang et al. | |
| 2004/0063798 A1 | 4/2004 | Erikstrup et al. | |
| 2005/0086864 A1 | 4/2005 | Burlingame et al. | |
| 2008/0038165 A1 | 2/2008 | Burlingame et al. | |
| 2008/0275143 A1 | 11/2008 | Malhotra et al. | |
| 2010/0074812 A1 | 3/2010 | Burlingame et al. | |

* cited by examiner

*Primary Examiner* — Prem C Singh
*Assistant Examiner* — Natasha Young
(74) *Attorney, Agent, or Firm* — Gary M. Machetta

(57) ABSTRACT

A reforming exchanger system for syngas production is provided. The reforming exchanger system can have a first and a second reforming exchanger, each with a shell-and-tube configuration, and a shift reactor located intermediate to the first and second reforming exchangers to reduce carbon monoxide concentration in the outlet gas. Processes for forming syngas using the reforming exchanger systems described herein are also provided.

20 Claims, 1 Drawing Sheet

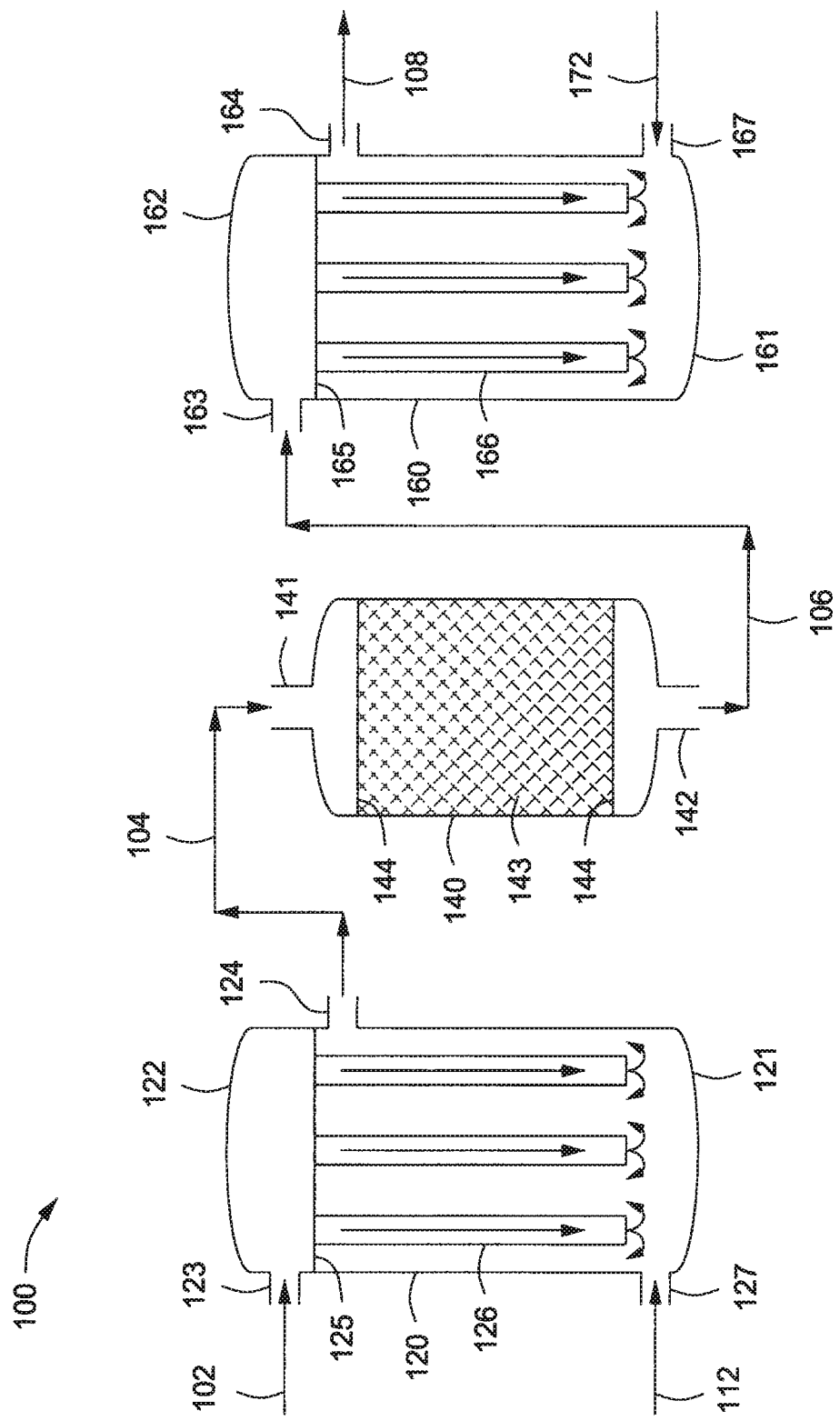

REFORMING EXCHANGER SYSTEM WITH INTERMEDIATE SHIFT CONVERSION

FIELD

Embodiments described generally relate to reforming exchangers for syngas production. More particularly such embodiments relate to a reforming exchanger system that includes two or more reforming exchangers in series with an intermediate shift reactor to reduce carbon monoxide concentration in a first gas mixture recovered from the first reforming exchanger to reduce the possibility of metal dusting within the second reforming exchanger. Embodiments also relate to processes for producing syngas using the reforming exchanger system discussed and described herein.

BACKGROUND

Steam reforming of a hydrocarbon to produce syngas is a well known process. One popular technique is to use an autothermal reformer in conjunction with a reforming exchanger. In such processes, one or more hydrocarbons and an oxygen source are supplied to the autothermal reformer. The combustion reaction is exothermic and supplies the heat needed for the catalytic reforming reaction that occurs in the autothermal reformer, which is endotheimic, to produce a relatively hot reformed gas. The hot reformed gas from the autothermal reformer is then used as a heat source in the reforming exchanger, which is operated as an endothermic catalytic steam reforming zone. In the reforming exchanger, a feed of steam and hydrocarbon(s) is passed through open-ended tubes filled with reforming catalyst. The outlet ends of the tubes discharge the endothermically reformed gas near the shell side inlet where it mixes with the hot reformed gas from the autothermal reformer. The hot gas mixture is then passed through the shell countercurrently across or along the tubes in indirect heat exchange to supply the heat necessary for the endothermic reforming reaction to occur.

Reforming exchangers are in use commercially and are available, for example, from Kellogg, Brown, & Root LLC under the trade designation KRES. Various improvements to the reforming exchanger design have been made and are disclosed in, for example, U.S. Pat. Nos. 5,362,454; 6,855,272; 7,635,456; and 7,550,215.

These and other prior art exchangers, however, can be limited in their operation due to metal dusting concerns. Metal dusting occurs under certain temperature and pressure conditions when carbon monoxide (CO) in the gas mixture on the shell side of an exchanger corrodes metal surfaces of the exchanger (such as, for example, the tubes and walls of the exchanger), forming metal powder that interferes with efficient operation of the exchanger and results in thinning of the metal surfaces. To minimize metal dusting, the shell side outlet gas must be at a temperature sufficiently higher than the critical temperature for carbon formation, which is the chemical equilibrium temperature for the Boudouard reaction:

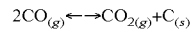

As a result, the extent of high grade waste heat recovery from the system is limited. Additionally, the mixed feed to the tube side of the exchanger may need to be pre-heated to address metal dusting concerns, which increases duty on an external heat source and limits heat integration opportunities.

There is a need, therefore, for improved systems and methods for reducing the potential for metal dusting within reforming exchangers, thereby widening the operating envelope of the reforming exchangers to include pressures and temperatures previously undesirable due to the risk of metal dusting.

BRIEF DESCRIPTION OF THE DRAWINGS

The FIGURE depicts a cross-sectional side elevation of an embodiment of a reforming exchanger system with intermediate shift conversion, according to one or more embodiments described.

DETAILED DESCRIPTION

The reforming exchanger system for syngas production can include a first and a second reforming exchanger, each with a shell-and-tube configuration, and a shift reactor located intermediate to the first and second reforming exchangers to reduce carbon monoxide concentration in the outlet gas and reduce metal dusting. Processes for forming syngas using the reforming exchanger systems described herein are also provided. The reforming exchanger system can include a shift reactor located intermediately between two reforming exchangers in series to convert carbon monoxide in the outlet gas from the first reforming exchanger to carbon dioxide ($CO_2$). The system can provide a reduced carbon monoxide concentration in the gas. Reducing the CO concentration can decrease the critical Boudouard reaction equilibrium temperature for carbon formation, which can allow for further cooling of the shell-side gas in the second reforming exchanger. Because the temperature of the shell-side gas can be reduced, more sensible heat can be recovered for reforming in the tube side of the second exchanger without increasing the risk of metal dusting. The intermediate shift reactor can also increase the amount of reforming takes place because the exothermic nature of the shift reaction creates favorable conditions for heat transfer in the second exchanger.

In one or more embodiments, the first reforming exchanger and the second reforming exchanger can be arranged in a series configuration, with a shift reactor located intermediate to (i.e., between) the first and second reforming exchangers. The first and second reforming exchangers can each include a vessel having a generally elongated shell with a first or relatively high temperature end and a second or relatively low temperature end, a shell side fluid inlet adjacent the first end for receiving a hot gas feed, a tube side fluid inlet adjacent the second end for receiving a reactant feed gas, a shell side fluid outlet fluidly isolated from the tube side fluid inlet by a tube sheet adjacent the second end for discharging a cooled gas mixture, and a tube bundle comprising a plurality of open-ended tubes. The tubes can have an inlet end secured to the tube sheet for receiving the gas feed and an outlet end adjacent the shell side fluid inlet for discharging reformed product gas into the hot gas feed to form a gas mixture. Optionally, a flow distributor may be disposed laterally between the shell side fluid inlet and the tube bundle of each of the reforming exchangers. In one or more embodiments, the tubes can include reforming catalyst disposed therein. The reforming catalyst can be disposed within the tubes along at least a portion of their length. The shift reactor can include a vessel having an inlet configured to receive the outlet gas from the shell side of the first reforming exchanger, a bed of shift catalyst contained within the vessel for selectively converting carbon monoxide (CO) to carbon dioxide ($CO_2$) to produce a reduced carbon monoxide ("reduced-CO") gas mixture, and an outlet configured to receive the reduced-CO gas mixture exiting the catalyst bed of the shift reactor and provide the reduced carbon monoxide gas mixture to the tube side fluid inlet of the second reforming exchanger.

In certain embodiments, the shell side flow path of the gas mixture in the reforming exchangers can be longitudinal in nature, such that the gas in the tubes and the gas in the shell flow counter-currently. The longitudinal shell side flow arrangement can provide efficient heat transfer with a low pressure drop in the shell side fluid. The longitudinal flow can also result in less costly reforming exchangers, since a relatively smaller shell diameter is required when compared to exchangers employing a cross-flow or transverse flow design. As used herein, the term "longitudinal" refers to the direction corresponding to the length of the reforming exchanger between the first and second ends, while the term "transverse" means transverse with respect to the longitudinal direction or axis unless otherwise indicated.

The first and second reforming exchangers can include one or more monolithic structures bearing reforming catalyst that can be disposed within the tubes for converting the reactant feed gas to reformed gas. In various embodiments, the catalyst-bearing monolithic structures can be in the form of, but are not limited to, a twisted tape inserts, central longitudinal runners with a plurality of bristles extending transversely therefrom, ceramic foam, Raschig rings, ribbed rings, or the like. The tubes can have an Lt/Dt ratio, where Lt is the length of the catalyst bearing portion of the tube and Dt is the inside diameter of the tube, of at least 180, or at least 220, or at least 260, or at least 300. It will be appreciated by those skilled in the art that the reforming catalyst can be any catalyst suitable for converting the reactant feed gas into a reformed product gas comprising carbon monoxide, carbon dioxide, and hydrogen.

In one or more embodiments, a catalyst support grid can be employed within the shift reactor to contain the shift catalyst bed. The catalyst support grid can be held in place by one or more tie rods. The tie rods can be secured to the shift reactor vessel by any suitable method, such as for example by welding, bolting, riveting, or the like. It will be appreciated by those skilled in the art that the shift catalyst can be any catalyst suitable for selectively converting carbon monoxide to carbon dioxide. Illustrative shift catalysts can be or include, but are not limited to, metals such as platinum, palladium, copper, oxides of alkali metals such potassium or sodium, oxides of an alkaline earth metal such as barium, oxides of magnesium, manganese, aluminum, zirconium, lanthanum, cerium, praseodymium and neodymium, or any combination thereof. The metal(s) and/or oxide(s) can be on or imbedded in a support of a refractory material such as alumina or a calcium aluminate. The shift catalyst can convert carbon monoxide to carbon dioxide with no or minimal methanation. Examples of suitable shift catalysts include, but are not limited to, those discussed and described in U.S. Pat. No. 5,030,440 and U.S. Patent Application Publication No. 2001/0055560. Similarly, the shift catalyst can be in any form or shape so long as it is suitable for use in the configuration of the shift reactor discussed and described herein, particularly within the dimensions of the catalyst support grid that contains the shift catalyst. For example, the catalyst can be in the form of spheres, rings, pellets, or any other suitable shape.

The first reforming exchanger can be operated so as to reduce or avoid metal dusting. Particularly, the reforming reaction in the first reforming exchanger can be stopped or otherwise controlled so that the temperature and carbon monoxide concentration in the shell side of the first reforming exchanger does not reach levels conducive to metal dusting. As a result, the feed gas to the first reforming exchanger can be only partially reformed therein. The first reforming exchanger can be operated so that the temperature of the gas exiting the shell side fluid outlet of the first exchanger and entering the shift reactor can be from about 700° C. to about 800° C., or from about 725° C. to about 775° C., or about 750° C.

The first and/or second reforming exchangers can further include one or more flow distributors disposed between the shell side fluid inlet and the tube bundle. The flow distributor can be, for example, one or more perforated plates or sheets. The one or more flow distributors can be positioned transversely across the vessel.

The tube bundle can further include one or more longitudinally spaced transverse ring baffles and/or one or more longitudinally spaced tube guides. The ring baffles can have a central flow window, where a portion of the tubes pass through the window and another portion can pass through an annular plate of the baffle. The tube guides may be in the form of transverse lattice support assemblies, which can include first and second sets of parallel lattice support bars adjacent a common plane and extending between the tubes with opposite ends of the support bars secured to a lattice support ring. The parallel lattice support bars in the first set can be transverse to the parallel lattice support bars in the second set. The tube bundle can also include tie rods connected thereto to maintain the lattice support assemblies in longitudinal displacement with respect to the tube sheet.

FIG. 1 depicts a cross-sectional side elevation of an illustrative reforming exchanger system 100, according to one or more embodiments. The reforming exchanger system 100 can include a first reforming exchanger 120, a shift reactor 140, and a second reforming exchanger 160. The first reforming exchanger 120 can be in the form of a vessel with an elongated shell having a first or relatively high temperature end 121 and a second or relatively low temperature end 122. A shell side fluid inlet 127 can be adjacent to the first end 121 of the first reforming exchanger 120. The shell side fluid inlet 127 can allow a first hot gas feed 112 (such as the effluent from an autothermal reformer, not shown) to enter the first reforming exchanger 120. A tube side fluid inlet 123 can be adjacent to the second end 122 of the first reforming exchanger 120. The tube side fluid inlet 123 can allow a reactant feed gas 102 to enter the first reforming exchanger 120. A shell side fluid outlet 124 can be fluidly isolated from the tube side fluid inlet 123 by a tube sheet 125. The shell side fluid outlet 124 can be adjacent to the second end 122 of the first reforming exchanger 120 and can allow a first gas mixture 104 to be discharged from the first reforming exchanger 120.

The first reforming exchanger 120 can include a tube bundle including one or more tubes 126 having an inlet end secured to the tube sheet 125 and an outlet end located adjacent to the shell side fluid inlet 127. One or more of the tubes 126 can contain reforming catalyst (not shown) suitable for reforming the reactant feed gas 102 to form a first reformed product gas. The first reformed product gas exiting the tubes 126 can mix with the first hot gas feed 112 to form the first gas mixture 104. A heat resistant refractory lining (also not shown) can optionally be affixed to an interior surface of the shell about the tube bundle.

The first gas mixture 104 exiting the first reforming exchanger 120 can be directed to the shift reactor 140. The shift reactor 140 can be in the form of a vessel with a fluid inlet 141 at one end of the vessel and a fluid outlet 142 at the second end of the vessel. Within the shift reactor 140, a bed of shift catalyst 143 can be contained within a catalyst support grid 144. The catalyst bed can include a shift catalyst as discussed and described above for selectively converting carbon monoxide in the first gas mixture 104 to carbon dioxide. The first gas mixture in line 104 can enter the fluid inlet 141 of the shift reactor 140 and pass through the catalyst bed 143, generating a reduced-CO gas mixture 106. The reduced-CO gas mixture 106 can exit the shift reactor 140 via fluid outlet 142 and can be directed to the second reforming exchanger 160. The reduced-CO gas mixture in line 106 can contain less carbon monoxide compared to the first gas mixture in line 104.

The second reforming exchanger 160 can be in the form of a vessel with an elongated shell having a first or relatively high temperature end 161 and a second or relatively low temperature end 162. A shell side fluid inlet 167 can be adjacent to the first end 161 of the second reforming exchanger 160. The shell side fluid inlet 167 can allow a second hot gas feed 172 (such as the effluent from an autothermal reformer, not shown) to enter the second reforming exchanger 160. A tube side fluid inlet 163 can be adjacent to the second end 162 of the second reforming exchanger 160. The tube side fluid inlet 163 can allow the reduced-CO gas mixture 106 to enter the second reforming exchanger 160. A shell side fluid outlet 164 can be fluidly isolated from the tube side fluid inlet 163 by a tube sheet 165. The shell side fluid outlet 164 can be adjacent to the second end 162 of the second reforming exchanger 160 and can allow a second gas mixture 108 to be discharged from the second reforming exchanger 160.

The second reforming exchanger 160 can include a tube bundle including one or more tubes 166 having an inlet end secured to the tube sheet 165 and an outlet end located adjacent to the shell side fluid inlet 167. The tubes can contain reforming catalyst (not shown) suitable for reforming the reduced-CO gas mixture 106 to form a second reformed product gas. The second reformed product gas can exit the tubes 166 and mixed with the second hot gas feed 172 to form the second gas mixture 108. A heat resistant refractory lining (also not shown) may optionally be affixed to an interior surface of the shell about the tube bundle.

The first and second reforming exchangers 120, 160 can optionally include one or more additional features not illustrated in the FIGURE. For example, some additional features and embodiments can be as discussed, described, and illustrated in U.S. Pat. Nos. 6,855,272 and 7,635,456.

For example, a discharge annulus can be defined between a flow sleeve disposed about the tube bundle and an enlarged end of the shell of one or more of the exchangers adjacent the shell-side fluid outlet, and in fluid communication between the shell-side flow path and the shell-side fluid outlet. The flow sleeve can have an open end and a sealed end. The open end can be spaced from the tube sheet in communication with the shell-side fluid outlet, while the sealed end forms a seal with the shell refractory lining at a base of the discharge annulus.

In one or more embodiments, the first and/or second reforming exchangers 120, 160 can also include a flange assembly adjacent to their second ends 122, 162, respectively. The flange assembly can be secured to the tube sheet using a support member. An example support member can include an annular lip mounted in the flange assembly, and a skirt that extends from and secured to the lip at one end and secured to the tube sheet at an opposite end. A tube sheet refractory lining can be located on a shell-side face of the tube sheet, and/or a skirt refractory lining can be located on an inside face of the skirt extending from adjacent the lip to the tube sheet. The first and/or second reforming exchangers 120, 160 can include a seal between the tube sheet refractory lining and an upper end of the shell refractory lining to inhibit shell side fluid entry into an annulus between the skirt and an inner wall of the vessel. As an example, the tube sheet refractory lining can be surfaced with a high temperature, erosion-resistant cap. The tube bundle can be removable from the shell.

In an embodiment, the seal between the shell refractory lining and the discharge annulus of one or more of the reforming exchangers can be formed by a base ring extending outwardly from the flow sleeve, and a seal between the base ring and a transverse annular surface formed in shell refractory lining at the base of the discharge annulus.

A hydrocarbon can be reformed using the reforming exchanger system 100 discussed and described above to produce a syngas. The process can include at least partially reforming a reactant feed gas in a first reforming exchanger to form a first gas mixture, providing the first gas mixture to a shift reactor, passing the first gas mixture through a shift catalyst bed within the shift reactor to selectively convert carbon monoxide in the first gas mixture to carbon dioxide forming a reduced-CO gas mixture, providing the reduced-CO gas mixture to a second reforming exchanger, and at least partially reforming the reduced-CO gas mixture in the second reforming exchanger to form a second gas mixture. In one or more embodiments of the process, each reforming exchanger can include an elongated shell having a first or relatively high temperature end and a second or relatively low temperature ends as discussed and described above.

In the same or other embodiments, the process can include supplying a reactant feed gas to a tube side fluid inlet adjacent the second end of the first reforming exchanger, supplying a hot gas feed to a shell side fluid inlet adjacent the first end of the first reforming exchanger, passing the reactant feed gas through a tube bundle comprising a plurality of tubes, where the tubes have an inlet end secured to a tube sheet adjacent the second end of the reforming exchanger and an outlet end adjacent the shell side fluid inlet, reforming the reactant feed gas in the tubes to form a first reformed product gas, discharging the first reformed product gas from the tubes into the hot gas feed to form a first gas mixture on the shell side of the first exchanger adjacent the shell side fluid inlet, passing the first gas mixture from the first end of the first exchanger to the second end of the first exchanger on the shell side, and discharging the first gas mixture from a shell side fluid outlet at the second end of the first exchanger, where the shell side fluid outlet is fluidly isolated from the tube side fluid inlet of the first exchanger by the tube sheet. The process can also include the steps of supplying the first gas mixture to the inlet of a shift reactor, contacting the first gas mixture with a shift catalyst to selectively convert carbon monoxide in the gas mixture to carbon dioxide, thus forming a reduced-CO gas mixture, and discharging the reduced-CO gas mixture from the shift reactor. Additionally, the process can include comprise the steps of supplying the reduced-CO gas mixture to a tube side fluid inlet adjacent a second end of the second reforming exchanger, supplying a hot gas feed to a shell side fluid inlet adjacent the first end of the second reforming exchanger, passing the reduced-CO gas through a tube bundle comprising a plurality of tubes, where the tubes have an inlet end secured to a tube sheet adjacent the second end of the exchanger and an outlet end adjacent the shell side fluid inlet, reforming the reduced-CO gas in the tubes to form a second reformed product gas, discharging the second reformed product gas from the tubes into the hot gas feed to form a second gas mixture on the shell side of the second exchanger adjacent the shell side fluid inlet, passing the second gas mixture from the first end of the second exchanger to the second end of the second exchanger on the shell side, and discharging the second gas mixture from a shell side fluid outlet at the second end of the second exchanger, where the shell side fluid outlet is fluidly isolated from the tube side fluid inlet of the second exchanger by the tube sheet.

The reactant feed gas 123 provided to the first reforming exchanger 120 can include a number of different compounds. For example, the reactant feed gas to the first reforming exchanger can include one or more hydrocarbons and steam. In another example, the reactant feed gas 123 can include one or more hydrocarbons, steam, hydrogen, carbon monoxide, carbon dioxide, or any combination thereof. The one or more hydrocarbons can include, but are not limited to, methane, ethane, propane, butane, pentane, or any combination thereof.

The temperature of the reactant feed gas 123 can be above the dew point of the feed gas. For example, the temperature of the reactant feed gas can range from about 300° C. to about 450° C. or from about 350° C. to about 400° C. In the same or other embodiments, the tubes 126 of the first reforming exchanger 120 can include catalyst-bearing monolithic structures disposed within the tubes 126 for converting the reactant feed gas 123 to the first reformed product gas. The reactant gas feed 123 can thus be at least partially reformed in the tubes 126, resulting in the first reformed product gas that can exit the tubes 126. The first reformed product gas can include, but is not limited to, hydrogen, carbon monoxide (CO) and carbon dioxide ($CO_2$). The first reformed product gas can also include residual hydrocarbons not reacted in the tubes. The residual hydrocarbons can include, but are not limited to, methane, ethane, propane, butane, pentane, or any combination thereof.

The hot gas feeds via lines 112 and/or 172 can be any fluid suitable for providing a heat source to the reforming exchanger. Such hot gas feeds via lines 112 and/or 172 can include, but are not limited to, effluent streams from autothermal reformers, secondary reformers, and/or steam methane reformers. The temperature of the hot gas feeds via lines 112 and/or 172 can generally range from about 600° C. to about 1,050° C. or from about 650° C. to about 1,000° C. The hot gas feeds via lines 112 and/or 172 to the first and/or second reforming exchangers 120, 160, respectively, can come from the same source or different sources, and the hot gas feed to each exchanger can have the same or different composition. The hot gas feeds via lines 112 and/or 172 to both the first and second exchangers 120, 160 can be an effluent supplied from the same autothermal reformer or different autothermal reformers. The hot gas feeds via lines 112 and/or 172 to both the first and second exchangers can be an effluent supplied from the same steam-methane reformer or different steam-methane reformers. The hot gas feeds via lines 112 and/or 172 to the first and/or second reforming exchanger 120, 160, respectively, can be an effluent supplied from an autothermal reformer and the hot gas feed to the other reforming exchanger, i.e., the first or second reforming exchanger, can be an effluent supplied from a steam-methane reformer. Other sources of suitable hot gas feeds can be or include effluents from partial oxidation reactors, catalytic partial oxidation reactors, gasifiers, and the like. Any combination of effluents can be used as the hot gas feeds via line 112 and line 172.

The hot gas feeds via lines 112 and/or 172 to the first reforming exchanger 120 and/or the second reforming exchanger 160 can include, but is not limited to, hydrogen, carbon monoxide, carbon dioxide, methane, ethane, propane, butane, pentane, steam, or any combination thereof.

In one or more embodiments, the first gas mixture in line 104 formed from mixing the first reformed product gas and the hot gas feed in the first reforming exchanger can be passed through a shift catalyst bed 143 contained within the shift reactor 140 located intermediate to (or in between) the first and second reforming exchangers 120, 160. The first gas mixture can be in direct contact with the shift catalyst, promoting a shift reaction that converts CO in the gas mixture to carbon dioxide ($CO_2$). This results in a gas having a reduced CO concentration ("reduced-CO gas mixture"), which in turn results in a decrease in the critical Boudouard reaction equilibrium temperature for carbon formation and allows for further cooling of the reduced-CO gas mixture. Because the temperature of the reduced-CO gas mixture can be reduced, more sensible heat can be recovered for reforming in the tube side of the second reforming exchanger without increasing the risk of metal dusting and the operating envelope of the exchanger system is widened to include pressures and temperatures previously undesirable due to the risk of metal dusting.

Further, the cost of the exchanger system can be reduced because lower operating temperatures can allow for the use of thinner or different metals for the tubes, tube sheet, and other components of the first and second exchangers. Another benefit of employing intermediate shift conversion between the first and second reforming exchangers is that increased reforming takes place because the exothermic nature of the shift reaction can create favorable conditions for heat transfer. In one or more embodiments, the temperature of the reduced-CO gas mixture fed to the second reforming exchanger can generally be from about 400° C. to about 580° C. or from about 440° C. to about 540° C.

Embodiments discussed and described herein further relate to any one or more of the following paragraphs:

1. A reforming exchanger system comprising: a first reforming exchanger comprising: an elongated shell having a first end and a second end; a shell side fluid inlet adjacent the first end of the first reforming exchanger for receiving a first hot gas feed; a tube side fluid inlet adjacent the second end of the first reforming exchanger for receiving a reactant feed gas; a shell side fluid outlet fluidly isolated from the tube side fluid inlet by a tube sheet adjacent the second end for discharging a first gas mixture from the first reforming exchanger; and a tube bundle comprising a plurality of tubes, wherein the tubes have an inlet end secured to the tube sheet for receiving the reactant feed gas and an outlet end adjacent the shell side fluid inlet for discharging a first reformed product gas into the hot gas feed to form the first gas mixture; a shift reactor comprising a bed of shift catalyst for converting carbon monoxide in the first gas mixture to carbon dioxide to form a reduced carbon monoxide gas mixture; and a second reforming exchanger comprising: an elongated shell having a first end and a second end; a shell side fluid inlet adjacent the first end of the second reforming exchanger for receiving a second hot gas feed; a tube side fluid inlet adjacent the second end of the second reforming exchanger for receiving the reduced carbon monoxide gas mixture; a shell side fluid outlet fluidly isolated from the tube side fluid inlet by a tube sheet adjacent the second end for discharging a second gas mixture from the second reforming exchanger; and a tube bundle comprising a plurality of tubes, wherein the tubes have an inlet end secured to the tube sheet for receiving the reduced carbon monoxide gas mixture and an outlet end adjacent the shell side fluid inlet for discharging a second reformed product gas into the second hot gas feed to form the second gas mixture.

2. The system according to paragraph 1, further comprising a longitudinal shell side flow path for the first gas mixture in the first reforming exchanger, the second gas mixture in the second reforming exchanger, or both.

3. The system according to paragraph 1 or 2, further comprising catalyst-bearing monolithic structures disposed within the tubes of one or both of the first and second reforming exchangers.

4. The system according to paragraph 3, wherein the tubes have an Lt/Dt ratio of at least about 300, wherein Lt is the length of the catalyst bearing portion of the tubes and Dt is the inside diameter of the tubes.

5. The system according to any one of paragraph 1 to 4, wherein the shift catalyst is contained in a catalyst support grid.

6. The system according to any one of paragraph 1 to 5, wherein the shift catalyst is in the form of spheres, rings, or pellets.

7. The system according to any one of paragraph 1 to 6, further comprising a flow distributor disposed between the shell side fluid inlet and the outlet end of the tube bundle of one or both of the first and second reforming exchangers.

8. The system according to any one of paragraph 1 to 7, wherein the shift reactor is located intermediate to the first and second reforming exchangers.

9. A process for the production of syngas in a reforming exchanger system comprising a first reforming exchanger, a shift reactor, and a second reforming exchanger, wherein the process comprises: providing a reactant feed gas to the first reforming exchanger; at least partially reforming the reactant feed gas in the first reforming exchanger to produce a first gas mixture; directing the first gas mixture to the shift reactor; passing the first gas mixture through a shift catalyst bed contained within the shift reactor to selectively convert carbon monoxide in the first gas mixture to carbon dioxide to produce a reduced carbon monoxide gas mixture; directing the reduced carbon monoxide gas mixture to the second reforming exchanger; and at least partially reforming the reduced carbon monoxide gas mixture in the second reforming exchanger to produce a second gas mixture.

10. The process according to paragraph 9, wherein each of the first and second reforming exchangers comprise an elongated shell having first and second ends and a flow path of the first and second gas mixtures from the first end to the second end on the shell side of the first and second reforming exchangers, respectively, is longitudinal.

11. The process according to paragraph 9 or 10, wherein a temperature of the reactant feed gas is from about 300° C. to about 450° C.

12. The process according to any one of paragraphs 9 to 11, wherein a temperature of the reactant feed gas is from about 350° C. to about 400° C.

13. The process according to any one of paragraphs 9 to 12, wherein a temperature of the reduced carbon monoxide gas mixture directed to the second reforming exchanger is from about 400° C. to about 580° C.

14. The process according to any one of paragraphs 9 to 13, wherein a temperature of the reduced carbon monoxide gas mixture directed to the second reforming exchanger is from about 440° C. to about 540° C.

15. A syngas reforming exchanger system comprising: a first reforming exchanger comprising: an elongated shell having relatively high and low temperature ends; a shell side fluid inlet adjacent the high temperature end of the first reforming exchanger for receiving a first hot gas feed; a tube side fluid inlet adjacent the low temperature end of the first reforming exchanger for receiving a reactant feed gas; a shell side fluid outlet fluidly isolated from the tube side fluid inlet by a tube sheet adjacent the low temperature end for discharging a first gas mixture from the first reforming exchanger; and a tube bundle comprising a plurality of tubes, wherein the tubes have an inlet end secured to the tube sheet for receiving the reactant feed gas and an outlet end adjacent the shell side fluid inlet for discharging a first reformed product gas into the first hot gas feed to form the first gas mixture; a shift reactor comprising a bed of shift catalyst for converting carbon monoxide in the first gas mixture to carbon dioxide to form a reduced carbon monoxide gas mixture; and a second reforming exchanger comprising: an elongated shell having relatively high and low temperature ends; a shell side fluid inlet adjacent the high temperature end of the second reforming exchanger for receiving a second hot gas feed; a tube side fluid inlet adjacent the low temperature end of the second reforming exchanger for receiving the reduced carbon monoxide gas mixture; a shell side fluid outlet fluidly isolated from the tube side fluid inlet by a tube sheet adjacent the low temperature end for discharging a second gas mixture from the second reforming exchanger; a tube bundle comprising a plurality of tubes, wherein the tubes have an inlet end secured to the tube sheet for receiving the reduced carbon monoxide gas mixture and an outlet end adjacent the shell side fluid inlet for discharging a second reformed product gas into the second hot gas feed to form the second gas mixture.

16. The system according to paragraph 15, further comprising a longitudinal shell side flow path for the gas mixture in one or both of the first and second reforming exchangers; catalyst-bearing monolithic structures disposed within the tubes of one or both of the first and second reforming exchangers; and a flow distributor disposed between the shell side fluid inlet and the outlet end of the tube bundle of one or both of the first and second reforming exchangers.

17. The system according to paragraph 16, wherein the tubes have an Lt/Dt ratio of at least about 300, wherein Lt is the length of the catalyst bearing portion of the tubes and Dt is the inside diameter of the tubes.

18. The system according to any one of paragraphs 15 to 17, wherein the shift catalyst is contained in a catalyst support grid.

19. The system according to any one of paragraphs 15 to 18, wherein the shift catalyst is in the form of spheres, rings, or pellets.

20. The system according to any one of paragraphs 15 to 19, wherein the shift reactor is located intermediate to the first and second reforming exchangers.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the invention is illustrative and explanatory of the present invention. Various changes in the materials, apparatus, and process employed will occur to those skilled in the art. It is intended that all such variations within the scope and spirit of the appended claims be embraced thereby.

We claim:

1. A reforming exchanger system comprising:
    a first reforming exchanger comprising:
        an elongated shell having a first end and a second end;
        a shell side fluid inlet adjacent the first end of the first reforming exchanger for receiving a first hot gas feed;
        a tube side fluid inlet adjacent the second end of the first reforming exchanger for receiving a reactant feed gas;
        a shell side fluid outlet fluidly isolated from the tube side fluid inlet by a tube sheet adjacent the second end for discharging a first gas mixture from the first reforming exchanger; and
        a tube bundle comprising a plurality of tubes, wherein the tubes have an inlet end secured to the tube sheet for receiving the reactant feed gas and an outlet end adjacent the shell side fluid inlet for discharging a first reformed product gas into the hot gas feed to form the first gas mixture;
    a shift reactor comprising a bed of shift catalyst for converting carbon monoxide in the first gas mixture to carbon dioxide to form a reduced carbon monoxide gas mixture; and
    a second reforming exchanger comprising:
        an elongated shell having a first end and a second end;
        a shell side fluid inlet adjacent the first end of the second reforming exchanger for receiving a second hot gas feed;
        a tube side fluid inlet adjacent the second end of the second reforming exchanger for receiving the reduced carbon monoxide gas mixture;
        a shell side fluid outlet fluidly isolated from the tube side fluid inlet by a tube sheet adjacent the second end for discharging a second gas mixture from the second reforming exchanger; and
        a tube bundle comprising a plurality of tubes, wherein the tubes have an inlet end secured to the tube sheet for receiving the reduced carbon monoxide gas mixture and an outlet end adjacent the shell side fluid inlet for discharging a second reformed product gas into the second hot gas feed to form the second gas mixture.

2. The system of claim 1, further comprising a longitudinal shell side flow path for the first gas mixture in the first reforming exchanger, the second gas mixture in the second reforming exchanger, or both.

3. The system of claim 1, further comprising catalyst-bearing monolithic structures disposed within the tubes of one or both of the first and second reforming exchangers.

4. The system of claim 3, wherein the tubes have an Lt1Dt ratio of at least about 300, wherein Lt is the length of the catalyst bearing portion of the tubes and Dt is the inside diameter of the tubes.

5. The system of claim 1, wherein the shift catalyst is contained in a catalyst support grid.

6. The system of claim 1, wherein the shift catalyst is in the form of spheres, rings, or pellets.

7. The system of claim 1, further comprising a flow distributor disposed between the shell side fluid inlet and the outlet end of the tube bundle of one or both of the first and second reforming exchangers.

8. The system of claim 1, wherein the shift reactor is located intermediate to the first and second reforming exchangers.

9. A process for the production of syngas in a reforming exchanger system comprising a first reforming exchanger, a shift reactor, and a second reforming exchanger, wherein the process comprises:
    providing a reactant feed gas to the first reforming exchanger;
    at least partially reforming the reactant feed gas in the first reforming exchanger to produce a first gas mixture;
    directing the first gas mixture to the shift reactor;
    passing the first gas mixture through a shift catalyst bed contained within the shift reactor to selectively convert carbon monoxide in the first gas mixture to carbon dioxide to produce a reduced carbon monoxide gas mixture;
    directing the reduced carbon monoxide gas mixture to the second reforming exchanger; and
    at least partially reforming the reduced carbon monoxide gas mixture in the second reforming exchanger to produce a second gas mixture.

10. The process of claim 9, wherein each of the first and second reforming exchangers comprise an elongated shell having first and second ends and a flow path of the first and second gas mixtures from the first end to the second end on the shell side of the first and second reforming exchangers, respectively, is longitudinal.

11. The process of claim 9, wherein a temperature of the reactant feed gas is from about 300° C. to about 450° C.

12. The process of claim 11, wherein a temperature of the reactant feed gas is from about 350° C. to about 400° C.

13. The process of claim 9, wherein the temperature of the reduced-CO gas mixture directed to the second reforming exchanger is from about 400° C. to about 580° C.

14. The process of claim 13, wherein the temperature of the reduced-CO gas mixture directed to the second reforming exchanger is from about 440° C. to about 540° C.

15. A syngas reforming exchanger system comprising:
    a first reforming exchanger comprising:
        an elongated shell having relatively high and low temperature ends;
        a shell side fluid inlet adjacent the high temperature end of the first reforming exchanger for receiving a first hot gas feed;
        a tube side fluid inlet adjacent the low temperature end of the first reforming exchanger for receiving a reactant feed gas;
        a shell side fluid outlet fluidly isolated from the tube side fluid inlet by a tube sheet adjacent the low temperature end for discharging a first gas mixture from the first reforming exchanger; and
        a tube bundle comprising a plurality of tubes, wherein the tubes have an inlet end secured to the tube sheet for receiving the reactant feed gas and an outlet end adjacent the shell side fluid inlet for discharging a first reformed product gas into the first hot gas feed to form the first gas mixture;
    a shift reactor comprising a bed of shift catalyst for converting carbon monoxide in the first gas mixture to carbon dioxide to form a reduced carbon monoxide gas mixture; and
    a second reforming exchanger comprising:
        an elongated shell having relatively high and low temperature ends;
        a shell side fluid inlet adjacent the high temperature end of the second reforming exchanger for receiving a second hot gas feed;
        a tube side fluid inlet adjacent the low temperature end of the second reforming exchanger for receiving the reduced carbon monoxide gas mixture;
        a shell side fluid outlet fluidly isolated from the tube side fluid inlet by a tube sheet adjacent the low temperature end for discharging a second gas mixture from the second reforming exchanger;

a tube bundle comprising a plurality of tubes, wherein the tubes have an inlet end secured to the tube sheet for receiving the reduced carbon monoxide gas mixture and an outlet end adjacent the shell side fluid inlet for discharging a second reformed product gas into the second hot gas feed to form the second gas mixture.

16. The system of claim 15, further comprising a longitudinal shell side flow path for the gas mixture in one or both of the first and second reforming exchangers; catalyst-bearing monolithic structures disposed within the tubes of one or both of the first and second reforming exchangers; and a flow distributor disposed between the shell side fluid inlet and the outlet end of the tube bundle of one or both of the first and second reforming exchangers.

17. The system of claim 16, wherein the tubes have an $Lt/Dt$ ratio of at least about 300, wherein $Lt$ is the length of the catalyst bearing portion of the tubes and $Ot$ is the inside diameter of the tubes.

18. The system of claim 15, wherein the shift catalyst is contained in a catalyst support grid.

19. The system of claim 15, wherein the shift catalyst is in the form of spheres, rings, or pellets.

20. The system of claim 15, wherein the shift reactor is located intermediate to the first and second reforming exchangers.

* * * * *